//////

United States Patent [19]

Pfeiffenberger

[11] Patent Number: 4,730,549
[45] Date of Patent: Mar. 15, 1988

[54] LIGHT-METAL RECIPROCATING PISTON

[75] Inventor: Horst Pfeiffenberger, Fellbach, Fed. Rep. of Germany

[73] Assignee: MAHLE GmbH, Stuttgart, Fed. Rep. of Germany

[21] Appl. No.: 297,573

[22] Filed: Aug. 31, 1981

Related U.S. Application Data

[63] Continuation-in-part of Ser. No. 15,135, Feb. 26, 1979, abandoned.

[30] Foreign Application Priority Data

Mar. 2, 1978 [DE] Fed. Rep. of Germany ....... 2808914

[51] Int. Cl.⁴ .............................. F16J 1/04; F02F 3/02
[52] U.S. Cl. ......................................... 92/239; 92/228; 92/230; 92/238
[58] Field of Search ................ 92/187, 228, 229, 230, 92/238, 239; 123/193 P

[56] References Cited

U.S. PATENT DOCUMENTS

| 1,675,174 | 6/1928 | Hartog | 92/239 |
| 2,238,087 | 4/1941 | Bowser et al. | 92/228 |
| 2,513,437 | 7/1950 | Venner et al. | 92/229 |
| 2,801,890 | 8/1957 | Nitsch | 92/230 |
| 3,175,475 | 3/1965 | Kuhm | 92/228 |
| 3,434,398 | 3/1969 | Gessinger et al. | 92/228 |
| 3,908,521 | 9/1975 | Cockcroft | 92/228 |

FOREIGN PATENT DOCUMENTS 363099  4/1906  France ..................... 92/208
1577353 10/1980 United Kingdom .

Primary Examiner—Charles T. Jordan
Assistant Examiner—Richard L. Klein
Attorney, Agent, or Firm—Murray and Whisenhunt

[57] ABSTRACT

A piston made of cast aluminum base alloy is provided with gudgeon pin bosses which are connected to the piston skirt by means of a frusto-conical strut which has recesses in the skirt and are specially dimensioned to leave large unsupported skirt areas to minimize risk of seizure in an engine cylinder; in particular the distance between the outer surfaces of the bosses is from 0.6 to 0.8 of the outer diameter of the piston and the distance between the inner surfaces of the bosses is 25 to 35 percent of the outer diameter of the piston, and the cone angle of the struts is from 60° to 110°.

1 Claim, 6 Drawing Figures

LIGHT-METAL RECIPROCATING PISTON

This application is a continuation-in-part of application Ser. No. 015135 filed Feb. 26, 1979 (priority Mar. 2, 1978) now abandoned.

BACKGROUND TO THE INVENTION

The invention relates to a light-metal reciprocating piston.

A piston of this type is known from U.S. Pat. No. 2,483,674. This is a light-weight and yet rugged piston which is intended to be highly loadable strengthwise. On the piston according to the mentioned U.S. publication, the gudgeon-pin boss support in the direction of the piston skirt areas at the pressure and counter-pressure ends is disadvantageous, for the tying of the gudgeon-pin bosses is effected therein perpendicularly to the pin axis in those areas. This has the disadvantage that in the pressure/counter-pressure direction areas the skirt is rigidly tied to the gudgeon-pin bosses over a length that is too large circumferencewise. As a result, the piston lacks in the pressure/counterpressure directions of the skirt sufficient protection against a seizure of the piston in the boss support area which is required along with a simultaneous minimisation of the piston weight. For, when the bosses are supported perpendicularly to the gudgeon-pin direction, there easily occurs in operation, due to the thin-walled construction of the piston skirt, a seizing of the piston at those points of the piston skirt at which the gudgeon-pin boss struts end at the piston-skirt end.

OBJECT OF THE INVENTION

Starting out from this situation, the object of the invention is to find an arrangement and a support of the gudgeon-pin bosses which, while minimising the piston weight, allows a tying of the gudgeon-pin boss to the piston skirt in the pressure/counter-pressure direction areas wherein the free radial unsupported circumference in these areas is as large as possible and minimizes the risk of seizure in an engine cylinder.

SUMMARY OF THE INVENTION

According to the invention there is provided an improved cast aluminium base alloy piston for internal combustion engines, comprising a piston head, a skirt connected at one end to said head, gudgeon-pin bosses extending radially inwards from window-like recesses formed in said skirt, the improvement comprising (a). two hollow frusto-conical struts extending inwardly from said skirt in the region of said window-like recesses formed integrally with said skirt and with said bosses respectively to support the latter, said frusto-conical struts having a cone angle of 60 to 110 degrees and supporting said bosses at positions whereby
  (i). the distance between the radially outer ends of said bosses is from 60–80 percent of the outer diameter of said skirt
  (ii). the distance between the radially inner ends of the bosses is 25–35 percent of the outer diameter of said skirt, and
  (iii). the circumferential length of the cylinder engaging surfaces of the portions of the skirt which extend between the window-like recesses are each longer than the diameter of the skirt, said portions of the skirt between the window-like recesses being unsupported so that said portions are flexible, said skirt being continuously free from all openings axially of the piston apart from said window-like recesses in all positions around the circumference of the skirt, and (b). two head struts disposed axially of the longitudinal axis of the piston extending between said piston head and said bosses respectively and serving to transmit compressive and tensile forces, each head strut being contiguous with the inside surface of the skirt and said bosses and being of such thickness in the direction of the common axis of the bosses that said bosses are supported along substantially their entire lengths.

The selection of the dimensions of the strut between the gudgeon-pin boss and the piston skirt is particularly important in the case of pistons which are to be extremely light in weight and have for this purpose gudgeon-pin bosses which, in order to save weight, are designed so as to be as narrow as possible and closely adjacent to the connecting rod, i.e. the gudgeonpin bosses do not extend as far as the piston skirt. The window-like skirt recesses provided in the gudgeon-pin direction also serve the purpose of saving weight. An adequate total stiffness of the piston, which is necessary for reasons of strength, necessitates a support in the direction of the piston skirt which covers the entire circumference of the gudgeonpin boss. By means of the invention, the skirt is elastically deformable at the level of the gudgeon-pin bosses over as wide a circumferential area as possible. The complete typing of the bosses to the piston skirt, also in the lower boss area, causes a certain stiffness of the skirt foot, which is desirable so as to prevent the piston skirt foot from collapsing circumferencewise in operation.

When use is made of expansion-controllable inserts consisting, for example, of steel, it is important that these inserts should be exactly adapted to the frusto-conical shape of the strut between the gudgeon-pin boss and the piston skirt.

DESCRIPTION OF PREFERRED EMBODIMENT

Figure 1:
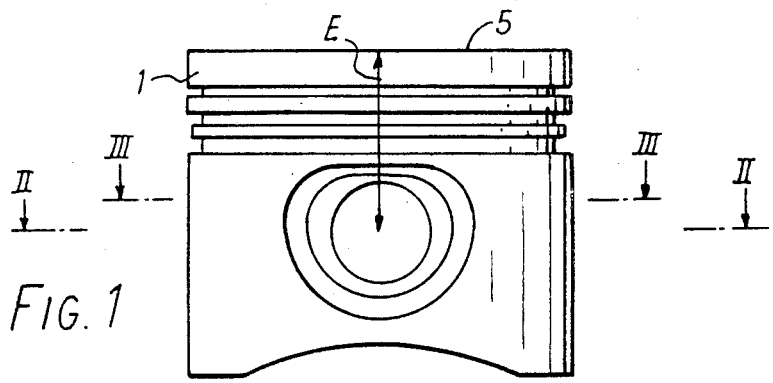
FIG. 1 shows an elevation of the piston according to the invention.
Figure 2:
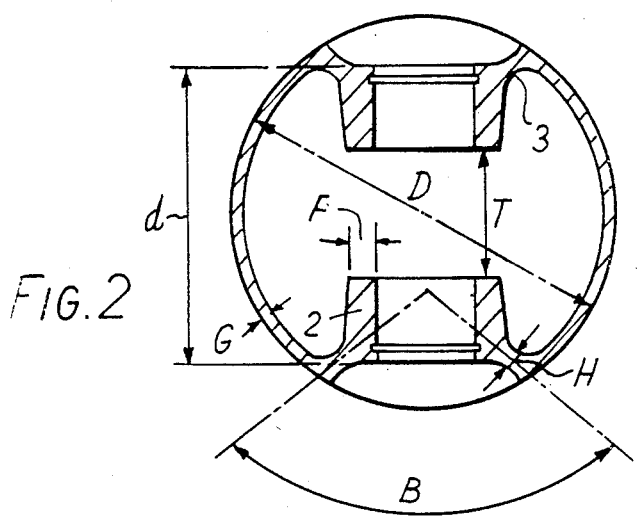
FIG. 2 shows a section through the piston along the line II—II in FIG. 1.

The piston 1 is provided, for the reception of a gudgeonpin not shown, with gudgeon-pin bosses 2 which are connected to the piston skirt through struts 3 which each comprise a frustum of a hollow cone. Head struts 8 are provided internally of the skirt and extend between the piston head 5 and each of said bosses and serve to transmit compressive and tensile forces. Each head strut is contiguous with its respective boss along substantially the entire axial length thereof and over a major portion of its circumferential length.

Figure 3:
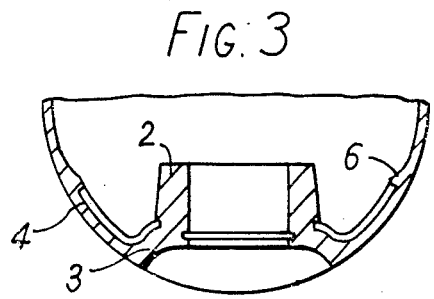
FIG. 3 shows a section through a piston, having an expantion-controlling insert, along the line III—III.
Figure 4:
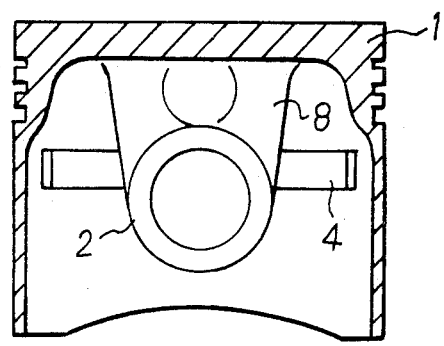
FIG. 4 is a vertical sectional view taken centrally between the gudgeon-pin bosses.
Figure 5:
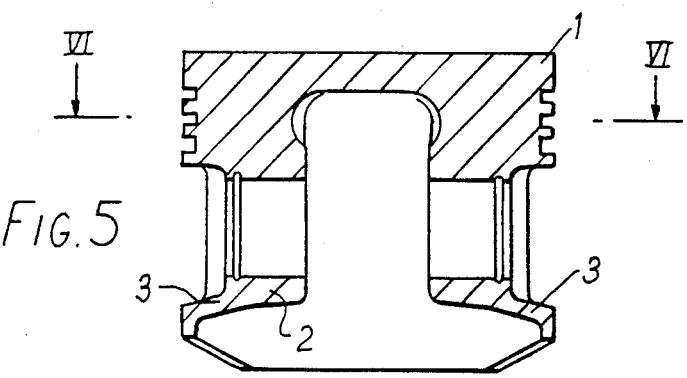
FIG. 5 is a vertical sectional view at right angles to FIG. 4.
Figure 6:
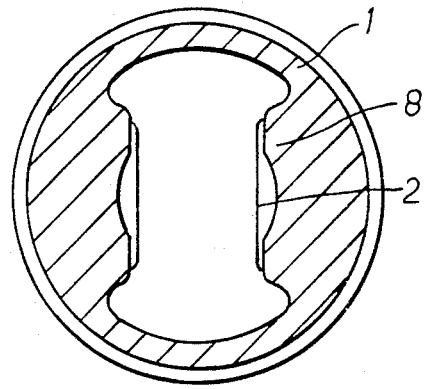
FIG. 6 is a sectional view on the plane V1—V1 on FIG. 5.

In the development of the piston according to the invention as shown in FIG. 3, an expansion-controlling steel insert 4 is provided for each boss 2 at the level of the upper third of the gudgeon-pin boss. Outside the gudgeon-pin bosses, the steel insert 4, which passes through the interior of the gudgeon-pin boss 2, engages at its outer end remote from the boss against an abutment 6 on the inner surface of the piston skirt. Between the gudgeon-pin boss 2 and the skirt of the piston 1 the insert bears against the inner surface of the strut 3 which has the shape of the frustum of a cone.

The cone angle B is less than 110° and preferably less than 100° but is at least 60°.

The wall thickness H of the frusto-conical strut is substantially constant and is less than that (F) of the free-standing gudgeon-pin wall of the boss 2. The thickness F of the boss wall is 150 to 300 percent of the piston wall thickness G. The distance d between the outermost exposed ends of the bosses is 60 to 80 percent of the diameter D of the piston.

The distance apart (T) of the inner surfaces of the bosses is 25 to 35 percent of the outer diameter D of the piston.

The distance E from the top surface of the piston to the centre line of the bosses is 30 to 55 percent of the piston diameter D.

I claim:

1. In a cast aluminum base alloy piston for internal combustion engines having a piston head, a cylindrical skirt connected at one end to said head, and two gudgeon pin bosses having bores located on a common axis and extending radially inwards from window-like recesses formed in said skirt, the improvement comprising:

(a) two hollow frusto-conical struts extending inwardly from said skirt in the region of said window-like recesses, formed integrally with said skirt and with said bosses, respectively, to support said bosses, said frusto-conical struts having a cone angle of 60 to 110 degrees and supporting said bosses at positions whereby (i). the distance between the radially outer ends of said bosses is from 60 to 80 percent of the outer diameter of said skirt, (ii). the distance between the radially inner ends of the bosses is 25 to 35 percent of the outer diameter of said skirt, and (iii). the circumferential length of the cylinder-engaging surfaces of the portions of the skirt which extend between the window-like recesses are each longer than the diameter of the skirt, said portions of the skirt between the window-like recesses being unsupported so that said portions are flexible, said skirt being continuously free from all openings axially of the piston apart from said window-like recesses in all positions around the circumference of the skirt, and (b) two head struts disposed axially of the longitudinal axis of the piston extending between said piston head and said bosses respectively and serving to transmit compressive and tensile forces, each head strut being contiguous with the inside surface of the skirt and said bosses and being of such thickness in the direction of the common axis of the bosses that said bosses are supported along substantially their entire lengths.

* * * * *